US009567979B2

(12) United States Patent
Goessling et al.

(10) Patent No.: US 9,567,979 B2
(45) Date of Patent: Feb. 14, 2017

(54) HIGH FREQUENCY BI-DIRECTIONAL AC POWER TRANSMISSSION

(71) Applicant: X Development LLC, Mountain View, CA (US)

(72) Inventors: Andrew Goessling, Oakland, CA (US); Leo Casey, San Francisco, CA (US)

(73) Assignee: X Development LLC, Mountain View, CA (US)

(*) Notice: Subject to any disclaimer, the term of this patent is extended or adjusted under 35 U.S.C. 154(b) by 0 days.

(21) Appl. No.: 14/826,542

(22) Filed: Aug. 14, 2015

(65) Prior Publication Data

US 2015/0354539 A1 Dec. 10, 2015

Related U.S. Application Data

(63) Continuation of application No. 14/144,667, filed on Dec. 31, 2013, now Pat. No. 9,151,272.

(51) Int. Cl.
*F03D 9/00* (2016.01)
*F03D 7/02* (2006.01)
(Continued)

(52) U.S. Cl.
CPC ............... *F03D 9/003* (2013.01); *B64D 35/02* (2013.01); *F03D 1/02* (2013.01); *F03D 7/026* (2013.01);
(Continued)

(58) Field of Classification Search
CPC ............... B64B 1/00; B64B 1/06; B64B 1/02; B64B 1/18; B64B 1/50; B64C 39/02; B64C 39/022; B64C 2201/148; F03D 9/003; F03D 9/002; F03D 1/02; F03D 7/026; H02J 3/382
See application file for complete search history.

(56) References Cited

U.S. PATENT DOCUMENTS 3,381,922 A * 5/1968 Laing ................. B05B 3/18
239/171
3,942,748 A * 3/1976 Wolkovitch .......... B64C 39/022
244/81
(Continued)

FOREIGN PATENT DOCUMENTS

| JP | 2011528637 A | 11/2011 |
|---|---|---|
| WO | 2010135604 A2 | 11/2010 |
| WO | 2013013219 A1 | 1/2013 |

OTHER PUBLICATIONS

David Cohn, "Windmills in the Sky", Wired, Apr. 6, 2005 (3 pages).
(Continued)

*Primary Examiner* — Jason C Smith
(74) *Attorney, Agent, or Firm* — McDonnell Boehnen Hulbert & Berghoff LLP

(57) ABSTRACT

A method may involve transmitting power between a tethered aerial vehicle equipped with wind turbines for generating power and a ground station configured to interconnect the generated power to an electrical distribution network. The power may be transmitted using high voltage, high frequency AC electrical signals, and transformers at the ground station and the aerial vehicle can scale the AC voltage for use at the respective locations. Converters at the ground station and the aerial vehicle can then convert the transformed voltage to DC. The AC voltage may be transmitted through the tether at a resonant frequency of the tether based in part on an internal capacitance between multiple conductive paths on the tether.

19 Claims, 8 Drawing Sheets

(51) Int. Cl.
*H02M 3/24* (2006.01)
*B64D 35/02* (2006.01)
*F03D 1/02* (2006.01)
*H02J 3/38* (2006.01)

(52) U.S. Cl.
CPC .............. *F03D 9/002* (2013.01); *H02J 3/382* (2013.01); *H02J 3/386* (2013.01); *H02M 3/24* (2013.01); *F05B 2240/921* (2013.01); *Y02E 10/723* (2013.01); *Y02E 10/763* (2013.01)

(56) References Cited

U.S. PATENT DOCUMENTS

| | | | | |
|---|---|---|---|---|
| 4,004,759 A * | 1/1977 | Hund | ............... | B64C 39/022 244/17.15 |
| 4,251,040 A * | 2/1981 | Loyd | ............... | B64C 39/022 244/1 R |
| 4,364,532 A * | 12/1982 | Stark | ............... | B64B 1/00 126/573 |
| 4,581,897 A * | 4/1986 | Sankrithi | ............... | F24J 2/07 126/573 |
| 4,981,456 A * | 1/1991 | Sato | ............... | B64C 39/022 244/17.13 |
| 6,422,506 B1 * | 7/2002 | Colby | ............... | B63B 49/00 114/242 |
| 7,317,261 B2 * | 1/2008 | Rolt | ............... | B64C 39/022 244/24 |
| 7,417,382 B2 | 8/2008 | Lin | | |
| 7,531,970 B2 * | 5/2009 | Yu | ............... | H05B 41/2824 315/128 |
| 7,708,222 B2 * | 5/2010 | Lee | ............... | B64B 1/50 244/115 |
| 8,006,933 B2 * | 8/2011 | Tillotson | ............... | B64B 1/06 244/127 |
| 8,076,860 B2 * | 12/2011 | Simi | ............... | H02M 7/53803 315/206 |
| 8,109,711 B2 * | 2/2012 | Blumer | ............... | B64B 1/50 415/121.3 |
| 8,602,349 B2 * | 12/2013 | Petrov | ............... | B64C 39/022 244/17.23 |
| 8,738,198 B2 * | 5/2014 | Schempf | ............... | B25J 11/002 701/2 |
| 8,864,063 B2 * | 10/2014 | Heppe | ............... | B64B 1/00 244/30 |
| 8,920,537 B2 * | 12/2014 | Seike | ............... | B03C 3/017 244/116 |
| 8,931,144 B2 * | 1/2015 | Freeman | ............... | A63H 30/02 24/1 |
| 8,948,928 B2 * | 2/2015 | Alber | ............... | B64C 39/022 244/17.11 |
| 2007/0200027 A1 * | 8/2007 | Johnson | ............... | B64C 39/022 244/3.1 |
| 2010/0013236 A1 * | 1/2010 | Carroll | ............... | B64C 39/022 290/55 |
| 2010/0221112 A1 * | 9/2010 | Bevirt | ............... | F03D 5/00 416/135 |
| 2010/0295303 A1 | 11/2010 | Lind et al. | | |
| 2010/0295320 A1 * | 11/2010 | Bevirt | ............... | B64C 39/022 290/55 |
| 2011/0057453 A1 * | 3/2011 | Roberts | ............... | F03D 1/02 290/55 |
| 2012/0097801 A1 * | 4/2012 | Barrett | ............... | B64C 27/24 244/7 A |
| 2012/0234965 A1 * | 9/2012 | Heppe | ............... | B64C 37/02 244/2 |
| 2012/0319407 A1 * | 12/2012 | Glass | ............... | F03D 1/04 290/55 |
| 2014/0361122 A1 * | 12/2014 | Ruiterkamp | ............... | F03D 5/00 244/154 |
| 2015/0184637 A1 * | 7/2015 | Vander Lind | ............... | F03D 7/0204 290/44 |
| 2015/0184639 A1 * | 7/2015 | Goessling | ............... | F03D 9/002 290/44 |
| 2015/0232200 A1 * | 8/2015 | Vander Lind | ............... | B64F 1/12 244/110 C |
| 2015/0275861 A1 * | 10/2015 | Goldstein | ............... | F03D 9/002 290/44 |
| 2015/0330368 A1 * | 11/2015 | Goldstein | ............... | F03D 9/002 290/44 |
| 2015/0375852 A1 * | 12/2015 | Hallamasek | ............... | F03D 13/20 244/175 |
| 2016/0002013 A1 * | 1/2016 | Hachtmann | ............... | F03D 13/20 254/266 |
| 2016/0010627 A1 * | 1/2016 | Austin | ............... | F03D 3/02 290/55 |
| 2016/0102654 A1 * | 4/2016 | GilroySmith | ............... | F03D 9/003 244/1 TD |

OTHER PUBLICATIONS

Alok Jha, "Giant kites to tap power of the high wind", The Observer, Aug. 2, 2008 (5 pages).

R.A. Friedemann et al., "Design of a Minimum Weight Dual Active Bridge Converter for an Airborne Wind Turbine System", Proceedings of the 27th Applied Power Electronics Conference and Exposition, Feb. 5-9, 2012, pp. 509-516.

J.W. Kolar et al., "Conceptualization and Multi-Objective Optimization of the Electric System of an Airborne Wind Turbine", Power Electronic Systems Laboratory, Proceedings of the 2011 IEEE International Symposium on Industrial Electronics, Jun. 27-30, 2011, pp. 32-55.

International Search Report and Written Opinion of International Application No. PCT/US2014/059235 dated Jan. 22, 2015 (mailed Jan. 23, 2015).

* cited by examiner

HIGH FREQUENCY BI-DIRECTIONAL AC POWER TRANSMISSSION

CROSS-REFERENCE TO RELATED APPLICATIONS

This patent application is a continuation of U.S. patent application Ser. No. 14/144,667 filed on Dec. 31, 2013, the entire contents of which are incorporated herein by reference.

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy. Wind energy systems may use turbines that have a rotor coupled to a generator. Incident wind turns the rotor, which rotates a shaft, and the generator can then use the motion of the shaft to generate electricity by moving one or more windings and/or magnets with respect to one another to induce oscillations in the magnetic flux through one of the windings, which creates an oscillating voltage across the winding.

Electrical power transmission and distribution systems distribute electrical energy using networks of conductive lines. Generally, electrical energy is conveyed from energy generation stations, to energy consumers. To efficiently convey electrical energy over the network, such networks generally carry high voltage, alternating current (AC) electrical signals. Because the power transmitted over a conductive line generally scales with the product of current and voltage, and the power dissipated in the conductive line generally scales with the current squared. Thus, for a given transmission power, increasing the voltage by a factor of 10 allows for decreasing the current by a factor of 10, which reduce the dissipated power by a factor of 100.

In addition, AC transmission lines allow for scaling the voltage level at various substations using transformers. A transformer has inductively coupled coils wrapped around a common magnetic core, with ends of each coil providing leads for an input signal and an output signal, respectively. Due to the relationship between magnetic flux and induced electromotive force in the inductively coupled coils, an AC voltage applied to one coil (e.g., using the input leads) generates a varying magnetic flux through the core and the other coil, which then results in a voltage across the leads of the other coil in proportion to the magnetic flux. Because the magnetic flux through each coil is proportionate to the number of windings of each around the common magnetic core, scaling the number of windings of each coil allows for scaling the AC voltage of the input relative to the output. Thus, using AC voltage, electrical energy can be conveniently transmitted over long distances at high voltage, then scaled ("stepped down") to lower voltages at various distribution points using transformers.

SUMMARY

Disclosed herein is a system in which a tethered aerial vehicle equipped with wind turbines for generating power transmits power through a tether to a ground station configured to connect (or interconnect) the generated power to an electrical distribution network. In addition, the tether is used to transmit power from the ground station to the aerial vehicle to provide power to the aerial vehicle when it is not generating power itself, such as during takeoff and/or landing operations. The power may be transmitted through the tether using high voltage, high frequency AC electrical signals, and transformers at the ground station and the aerial vehicle can scale the AC voltage for use at the respective locations. The AC voltage may be transmitted through the tether at a resonant frequency of the tether based in part on an internal capacitance between multiple conductive paths on the tether.

In one aspect, a system includes an aerial vehicle, a tether, and a ground station. The aerial vehicle can include a propeller, a motor-generator mechanically coupled to the propeller, a DC bus electrically coupled to the motor-generator, a transformer, and a converter electrically coupled to the transformer. The motor-generator can be configured to alternately: (i) use energy from the DC bus to move the propeller and thereby generate thrust on the aerial vehicle, and (ii) generate electrical energy from movement of the propeller and, using the generated electrical energy, supply the DC bus. The tether can be coupled to the aerial vehicle. The tether can include a first conductive path and a second conductive path configured to transmit an AC voltage by the first conductive path conducting a periodically varying voltage with respect to a voltage on the second conductive path. The ground station can be coupled to aerial vehicle via the tether. The ground station and the DC bus in the aerial vehicle can be configured to transmit power between one another via the tether. The tether can have an internal tether capacitance between the first conductive path and the second conductive path. The transformer can be configured to transform between the AC voltage transmitted through the tether and a reduced AC voltage. The converter can be configured to convert between the reduced AC voltage and a DC voltage that supplies the DC bus.

In another aspect, a method is disclosed. The method can include converting power to a high frequency AC voltage. The method can include transforming the high frequency AC voltage to a high voltage transmission level. The method can include transmitting the transformed high frequency AC voltage to an aerial vehicle through a tether. The method can include transforming, via a transformer disposed on the aerial vehicle, the high frequency AC voltage from the high voltage transmission level to a lower voltage level. The method can include converting the transformed high frequency AC voltage, transformed by the transformer to the lower voltage level, to a DC voltage. The method can include drawing power from the converted DC voltage to power the aerial vehicle.

In another aspect, a method is disclosed. The method can include generating power by a generator coupled to a wind turbine situated on an aerial vehicle. The method can include converting the generated power to a high frequency AC voltage. The method can include transforming the high frequency AC voltage to a high voltage transmission level using a transformer on the aerial vehicle. The method can include transmitting the transformed high frequency AC voltage to a ground station through a tether.

In yet another aspect, some embodiments of the present disclosure provide a means for generating power by a generator coupled to a wind turbine situated on an aerial vehicle. Some embodiments of the present disclosure provide a means for converting the generated power to a high frequency AC voltage. Some embodiments of the present disclosure provide a means for transforming the high frequency AC voltage to a high voltage transmission level using a transformer on the aerial vehicle. Some embodiments of the present disclosure provide a means for transmitting the transformed high frequency AC voltage to a ground station through a tether.

These as well as other aspects, advantages, and alternatives, will become apparent to those of ordinary skill in the art by reading the following detailed description, with reference where appropriate to the accompanying drawings.

DETAILED DESCRIPTION

Figure 1:
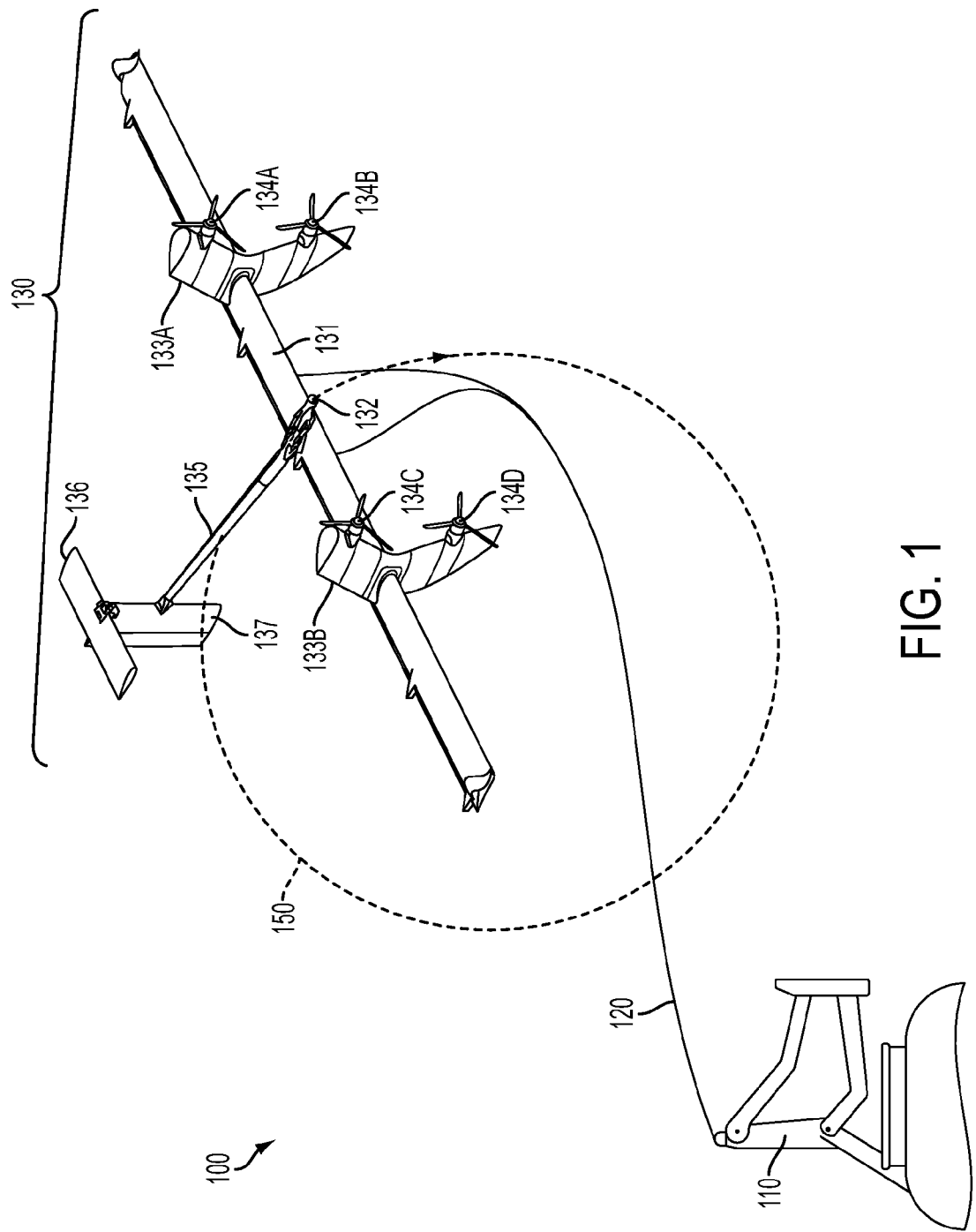
FIG. 1 depicts an Airborne Wind Turbine (AWT), according to an example embodiment.

Example methods and systems are described herein. It should be understood that the word "example" is used herein to mean "serving as an example, instance, or illustration." Any embodiment or feature described herein as "example" or "illustrative" is not necessarily to be construed as preferred or advantageous over other embodiments or features. More generally, the embodiments described herein are not meant to be limiting. It will be readily understood that certain aspects of the disclosed methods systems and can be arranged and combined in a wide variety of different configurations, all of which are contemplated herein.

I. Overview

Embodiments relate to aerial vehicles used in a wind energy system, such as an airborne wind turbine (AWT) system. In particular, embodiments may relate to an AWT system in which electrical energy is transmitted between an aerial vehicle equipped with generators driven by propellers and a ground station. Power generated on the aerial vehicle can be transmitted by AC electrical signals carried on a conductive tether that connects the aerial vehicle and the ground station.

By way of background, an AWT system may include an aerial vehicle that flies along a path while connected to a ground station via a tether. While in flight, the AWT converts wind energy to electrical energy using a rotor (propeller) coupled to a generator. To generate electricity, a combination of the motion of the aerial vehicle and wind causes the rotor to turn, which provides torque to a shaft that turns magnets/windings in the generator, which generates electricity. The AWT may also use the propeller to generate thrust on the aerial vehicle by applying torque to the propeller, which may be performed by a combination motor-generator. In some cases, the AWT may generate thrust and/or manipulate air foils on the aerial vehicle to cause the aerial vehicle to: take off from the ground station, fly at a range of elevations and substantially along the path, and land at the ground station. While in flight, depending on the maneuvers involved, the AWT alternately generates electrical energy from wind kinetic energy and consumes electrical energy to power the propeller for thrust generation.

The aerial vehicle may rest in and/or on its ground station (or perch) when wind conditions are not conducive to power generation. The ground station may also deploy (or launch) the aerial vehicle once conditions are conducive to power generation. In addition, when the aerial vehicle is deployed and the wind is not conducive to power generation, the aerial vehicle may return to the ground station.

The AWT is connected to the ground station by a tether that is used to carry electrical energy between the AWT and the ground station and optionally to transmit communications signals. In practice, while the AWT is used to generate electrical energy, such as during crosswind flight, the tether may be used to transmit electrical energy from the AWT to the ground station. While the AWT is used to generate thrust, such as during take-off and/or landing, the tether may be used to transmit electrical energy from the ground station to the AWT.

In some implementations, an aerial vehicle in such a wind power system is equipped with multiple AWTs (i.e., multiple propellers coupled to motor-generators), as well as various avionics sensors, communication systems, and control modules. The various electronics on the aerial vehicle can receive power from a DC bus on the aerial vehicle, which may be a bus having a DC capacitance or the like. The individual AWTs may then draw power from the DC bus, when used to generate thrust, and may supply power to the DC bus, when used to generate electrical energy.

High voltage, high frequency AC electrical signals are used to transmit electrical energy between the aerial vehicle and the ground station over the tether. High voltage (e.g., about 5 kilovolts) is used to mitigate transmission losses over the tether. AC is used to allow for the use of transformers to step voltage up/down at the aerial vehicle. High frequency (e.g., about 5 kilohertz) is used to reduce the size and weight of transformers placed on the aerial vehicle. Generally, because magnetizing currents reduce with frequency, and induced voltage increases with frequency, higher frequency AC signals require smaller magnetic cores to transform the same amount of power as lower frequency signals. As a result, for a given power, transformers operating at higher frequencies can employ relatively smaller (and lighter) magnetic components than transformers operating at lower frequencies. In comparison to AC frequencies typically employed in electrical power distribution grids (e.g., about 50 Hz or about 60 Hz), or even aboard some aircraft (e.g., about 400 Hz), the frequencies used to convey power over the tether may be much greater, perhaps even an order of magnitude greater than such grid frequencies.

The aerial vehicle also includes an AC to DC converter to convert the AC voltage on the tether to DC voltage for the DC bus. The converter handles AC signals to/from the transformer, which allows the converter to operate at a voltage level determined by the transformer winding ratio. The AC/DC converter may include two AC terminals and two DC terminals and a combination of switches that alternately switch the polarity of the incoming/outgoing AC terminals relative to the DC terminals. Rectifiers and/or other signal conditioning devices may also be included in the AC/DC converter. Similarly, the ground station can also include a transformer, which scales voltage from the tether, and an AC/DC converter, which converts the transformed voltage to DC. The AC/DC converter at the ground station can then interconnect with an inverter or other module that converts between the DC voltage and voltages suitable for connection with a power distribution network, such as polyphase AC signals at 50 Hz or 60 Hz.

However, the tether exhibits internal capacitance, and so driving the AC signal on the tether involves oscillating the voltage across the tether capacitance. As such, a DC voltage source connected to the tether via the AC/DC conversion switching network charges the tether capacitance. Then, upon switching the polarity applied to tether, the switching energy from reversing the polarity of the voltage source (e.g., due to rapidly discharging and recharging the tether capacitance) is dissipated in one of the switches in the switching network in proportion to the square of the voltage across the switch when the switch is opened.

The present disclosure provides for two different techniques to transmit AC on the tether while mitigating switching losses. In one example, a DC current source, rather than a DC voltage source, is coupled to the AC/DC converter. Upon reversing polarity of the current source, via the switching network, the voltage in the tether capacitance ramps to reflect the reversed polarity. The tether capacitance acts to slew the voltage between extremes, and thereby avoids sudden transitions and attendant switching losses.

In another example, the tether capacitance is used to create a resonant network configured to oscillate at the driving frequency. In particular, one or more inductors can be coupled to the tether to create a circuit with a resonance oscillation frequency defined, at least in part, by a combination of the inductance of the inductors and the tether capacitance. Thus, the tether capacitance can be incorporated into a resonant network for transmitting energy between the aerial vehicle and the ground station. In addition, the tether capacitance can be supplemented by adding capacitors at the ground station and/or aerial vehicle. The additional capacitors can be used to achieve a desired capacitance and/or to reduce the effects of variations in the tether capacitance. As a result, the voltage on the tether naturally adopts a sinusoidal form and the switching networks in the AC/DC converters can be operated to achieve zero voltage switching (ZVS), which substantially mitigates switching losses.

II. Example Power Generation Systems

A. Airborne Wind Turbine (AWT)

FIG. 1 depicts an AWT 100, according to an example embodiment. The AWT 100 includes a ground station 110, a tether 120, and an aerial vehicle 130. The aerial vehicle 130 may be connected to the tether 120, and the tether 120 may be connected to the ground station 110. The ground station 110 may be further connected to a network for distribution and/or transmission of electrical power (e.g., the electrical power distribution network commonly referred to as "the grid"). The aerial vehicle 130 includes propellers 134A-D coupled to generators. During flight, motion of the propellers 134A-D is converted to electrical energy by the generators. The AWT 100 can therefore be used to generate electrical power. In practice, electrical energy generated aboard the aerial vehicle 130 may be transmitted to the ground station 110 via the tether 120, and the ground station 110 (and/or one or more intermediary substations) may then transmit electrical power to an electrical power distribution network (e.g., via polyphase AC voltage signals).

As shown in FIG. 1, the tether 120 may be attached to the ground station 110 at one location on the ground station 110, and attached to the aerial vehicle 130 at two locations on the aerial vehicle 130. However, in other examples, the tether 120 may be attached at one or more locations to any part of the ground station 110 and/or the aerial vehicle 130.

The ground station 110 may be used to hold and/or support the aerial vehicle 130 until it is in an operational mode. The ground station 110 may also be configured to allow for repositioning the aerial vehicle 130 for deployment. Further, the ground station 110 may be further configured to receive the aerial vehicle 130 during a landing. The ground station 110 may be formed of any material that can keep the aerial vehicle 130 attached and/or anchored to the ground (via the tether 120) while the aerial vehicle 130 operates in hover flight, forward flight, and/or crosswind flight. In some implementations, a ground station 110 may be configured for use on land. However, a ground station 110 may also be implemented on a body of water, such as a lake, river, sea, or ocean. For example, a ground station could include or be arranged on a floating off-shore platform or a boat, among other possibilities. Further, a ground station 110 may be configured to remain stationary or to move relative to the ground or the surface of a body of water.

In addition, the ground station 110 may include one or more components (not shown), for adjusting the length of the tether 120, such as a winch. For example, when the aerial vehicle 130 is deployed, the ground station 110 may reel in/out the tether 120. In some implementations, the ground station 110 may be configured to reel out the tether 120 to a predetermined length that allows the aerial vehicle 130 to fly along a predetermined flight path 150. Further, when the aerial vehicle 130 lands, the ground station 110 may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. In some examples, the tether 120 may have a fixed length and/or a variable length. The tether 120 may be constructed in any form and using any material which may allow for the transmission, delivery, and/or harnessing of electrical energy generated by the aerial vehicle 130 and/or transmission of electricity to the aerial vehicle 130.

The tether 120 may also be configured to withstand one or more tensile forces from the aerial vehicle 130 when the aerial vehicle 130 is in flight. For example, the tether 120 may include a core configured to withstand one or more forces of the aerial vehicle 130 when the aerial vehicle 130 is in hover flight, forward flight, and/or crosswind flight. The core may be constructed of high tensile strength fibers. In addition to a high tensile strength core, the tether 120 may include one or more conductive wires, such as formed of aluminum, copper, and/or another conductor useful for transmitting electricity (carbon nanotubes, etc.). The conductive wire(s) may be stranded or solid and may be surrounded by a variety of different shielding and/or insulators. For example, a load-bearing core may be surrounded by two or more insulated and/or shielded conductive wires, and a jacket may optionally surround both the insulated/shielded wires and the core. The conductive wires can be used to provide conductive paths between the aerial vehicle and the ground station and power can be transmitted over the conductive paths by applying electrical signals to the conductive wires.

The aerial vehicle 130 may be configured to fly substantially along a path 150 to generate electrical energy. The term "substantially along," as used in this disclosure, refers to exactly along and/or one or more deviations from exactly along that do not significantly impact generation of electrical energy as described herein. In addition, the aerial vehicle may depart from particular flight paths during transitions between certain flight modes as described herein.

The aerial vehicle 130 may include or take the form of various types of devices configured to generate lift from motion through the atmosphere, such as a kite, a helicopter, a wing and/or an airplane, among other possibilities. The aerial vehicle 130 may be formed of solid structures of metal, plastic and/or other polymers that form air foils. The aerial vehicle 130 may include structures configured to allow for a high thrust-to-weight ratio. Materials may be selected to allow for a lightning-hardened, redundant and/or fault-tolerant design which may be capable of handling large and/or sudden shifts in wind speed and wind direction among other changes in environmental conditions.

In addition, electrical generation and/or transmission components may be included in the aerial vehicle 130 (e.g., generators, voltage converters, transformers, etc.). Such components can be configured to generate electrical energy while the aerial vehicle 130 is in flight and transmit that electrical energy over the tether 120. Other materials may be possible as well.

The flight path 150 may assume various different shapes in different embodiments. For example, the path 150 may be substantially circular. And in at least one such example, the path 150 may have a radius of about 265 meters. The term "substantially circular," as used in this disclosure, refers to exactly circular and/or one or more deviations from exactly circular that do not significantly impact generation of electrical energy as described herein. Other shapes for the path 150 may be an oval, an ellipse, the shape of a jelly bean (or kidney), the shape of the number 8, etc. In some cases, the path 150 may allow for crosswind flight, in which the direction of flight along the path 150 is substantially transverse to a wind direction along the entire length of the flight path 150. Crosswind flight may be achieved by orienting the path 150 with a plane defined by the outline of the path 150 having a normal direction substantially aligned with the wind direction, for example.

As shown in FIG. 1, in an example embodiment the aerial vehicle 130 may include a main wing 131, a front section 132, rotor connectors 133A-B, rotors 134A-D, a tail boom 135, a tail wing 136, and a vertical stabilizer 137. Any of these components may be air foils shaped in any form which facilitates generation of lift and/or thrust.

The main wing 131 may provide primary lift for the aerial vehicle 130. The main wing 131 may include one or more rigid or flexible airfoils, and may include various control surfaces, such as winglets, flaps, rudders, elevators, etc. The control surfaces may be used to stabilize the aerial vehicle 130 and/or reduce drag on the aerial vehicle 130 during hover flight, forward flight, and/or crosswind flight.

The main wing 131 and other airfoils included on the aerial vehicle may be fabricated from a laminated fibrous material, such as carbon fiber or e-glass, and/or from aluminum or another sheet metal, for example. Moreover, the main wing 131 may have a span of 8 meters, an area of 4 meters squared, and an aspect ratio of 15. In some cases, the main wing 131 may have one or more dimensions that correspond with a conventional wind turbine blade. The front section 132 may include one or more components, such as a nose, configured to reduce drag on the aerial vehicle 130 during flight.

The rotor connectors 133A-B may connect the rotors 134A-D to the main wing 131. The rotors 134A-D are alternately referred to herein as propellers and include multiple blades that turn in response to wind. The rotors 134A-D are coupled to the main wing 131 by rotor connectors 133A-B. In some examples, the rotor connectors 133A-B may take the form of or be similar in form to one or more pylons. The rotor connectors 133A-B can be arranged such that the rotors 134A-D are separated from the main wing 131 by a vertical spacing (e.g., the rotor 134A can be situated above the main wing 131 and the rotor 134B can be situated below). In some examples, a vertical spacing between corresponding rotors (e.g., rotor 134A and rotor 134B or rotor 134C and rotor 134D) may be about 0.9 meters.

The rotors 134A-D may be configured to drive one or more generators for the purpose of generating electrical energy. The rotors 134A-D may each include one or more blades, such as three blades. And the blades can be coupled to a shaft, which is coupled to a generator. During flight, the blades interact with the atmosphere and provide a torque on the shaft. Within the generator, the motion of the rotating shaft is used to drive interactions between a conductive coil and a magnetic field so as to vary the magnetic flux through the conductive coil and thereby induce a time-changing electromotive force across the coil (e.g., an armature equipped with a conductive coil that rotates within a magnetic field), and thereby convert the mechanical energy of the rotating blades to electrical energy. In addition, the rotors 134A-D may also be configured to provide a thrust to the aerial vehicle 130 during flight. For example, a time-changing current may be applied to the conductive coil within the generator, which creates a torque on the shaft coupled to the blades. With this arrangement, the rotors 134A-D may function as one or more propulsion units, such as a propeller, and the generator may function as a motor. In another example, the motor-generator may be driven by (and be used to generate) DC currents/voltages, such as an example in which a coil rotates with respect to a magnetic field and is connected via brush connectors to be driven by a DC source (or to generate a DC output). Although the aerial vehicle 130 is equipped with four rotors in this example, in other examples the aerial vehicle 130 may include any number of rotors, such as less than four rotors or more than four rotors.

The tail boom 135 can connect the main wing 131 to the tail wing 136. The tail boom 135 could take the form of a body and/or fuselage of the aerial vehicle 130 and may optionally carry a payload. In an example, the tail boom 135 may have a length of about 2 meters. The tail wing 136 and/or the vertical stabilizer 137 may be used to stabilize the aerial vehicle 130 and/or reduce drag on the aerial vehicle 130 during hover flight, forward flight, and/or crosswind flight. For example, the tail wing 136 and/or the vertical stabilizer 137 may be used to maintain a pitch of the aerial vehicle 130 during hover flight, forward flight, and/or crosswind flight. The vertical stabilizer 137 can be attached to the tail boom 135, and the tail wing 136 can be located on top of the vertical stabilizer 137. In some examples, the tail wing 136 may have a length of about 2 meters and a surface area of about 0.45 meters squared. Further, the tail wing 136 may be located about 1 meter above a center of mass of the aerial vehicle 130.

While the aerial vehicle 130 has been described above in accordance with a particular implementation, it should be understood that the methods and systems described herein may involve a variety of different aerial vehicles configured to generate power during flight while connected to the ground station 110 via tether 120.

B. Illustrative Components of an AWT

Figure 2:
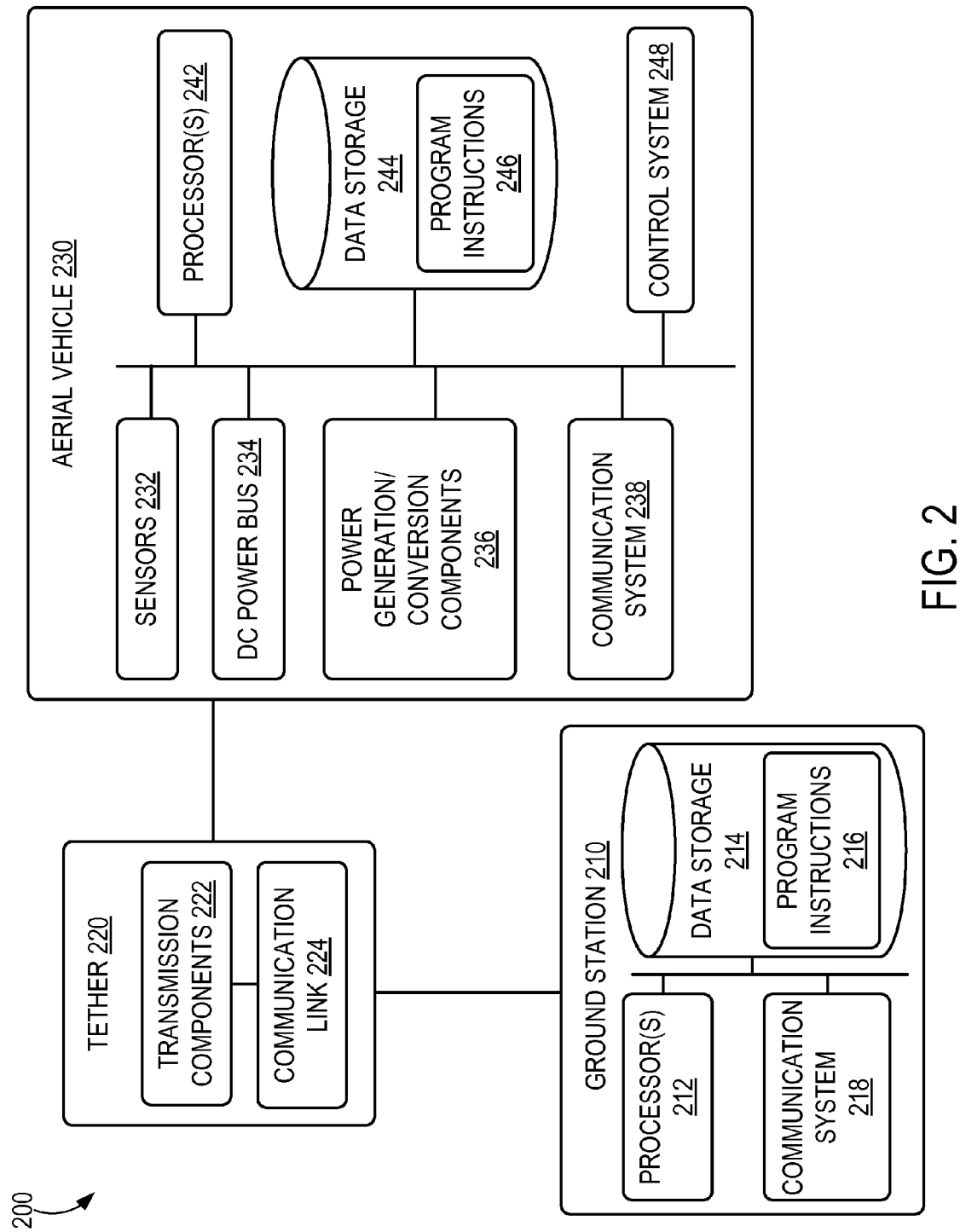
FIG. 2 is a simplified block diagram illustrating components of a system using an AWT, according to an example embodiment.

FIG. 2 is a simplified block diagram illustrating components of the AWT 200. The AWT 200 may take the form of or be similar in form to the AWT 100. The AWT 200 includes a ground station 210, a tether 220, and an aerial vehicle 230. The ground station 210, the tether 220, and the aerial vehicle 230 may be the same as, or similar to, the ground station 110, the tether 120, and the aerial vehicle 130 described above in connection with FIG. 1.

As shown in FIG. 2, the ground station 210 may include one or more processors 212, data storage 214, and program instructions 216. The processor(s) 212 may include general-purpose processor and/or special purpose processor (e.g., digital signal processors, application specific integrated circuits, etc.). The processor(s) 212 can be configured to execute computer-readable program instructions 216 that are stored in the data storage 214. Execution of the program instructions can cause the ground station 210 to provide at least some of the functions described herein.

In a further respect, the ground station 210 may include a communication system 218. The communications system 218 may include one or more wireless interfaces and/or one or more wireline interfaces, which allow the ground station 210 to communicate via one or more networks. Such wireless interfaces may provide for communication under one or more wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the communication system 218 may allow for both short-range communication and long-range communication. For example, the ground station 210 may be configured to function as a gateway or proxy between a remote support device (e.g., the aerial vehicle 230 and/or other ground stations) and one or more data transport networks. Configured as such, the ground station 210 may operate to serve data communications to/from such remote support device(s).

The tether 220 can be physically connected to the ground station 210 and the aerial vehicle 230 via respective mounts at each. The tether mounts may incorporate adjustable components to account for relative motion between the aerial vehicle 230 and the ground station 210. For example, the tether 220 may connect to the aerial vehicle 230 via a gimbal mount. The tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may include one or more conductors and may include shielding and/or insulation. In some examples, the transmission components 222 may include aluminum and/or another material which allows for the conduction of electric current. Moreover, in some implementations, the transmission components 222 may surround a load-bearing core of the tether 220 (not shown). For instance, a steel core or other high tensile-strength material may be surrounded by aluminum. In some examples, the transmission components 222 may include two separate wires, separated by insulators and/or shielding and may be used to transmit AC and/or DC electrical signals.

The ground station 210 may communicate with the aerial vehicle 230 via the communication link 224. The communication link 224 may be bidirectional and may include one or more interfaces. There may be one or more routers, switches, and/or other devices or networks making up at least a part of the communication link 224. In addition, in examples in which the communication link 224 includes a communication cable for carrying signals between the ground station 210 and the aerial vehicle 230, the cable may include shielding and/or insulation to help reduce noise that may be associated with power transmission on the transmission components 222 also included in the tether 220.

The aerial vehicle 230 may include one or more sensors 232, a power bus 234, power generation and/or conversion components 236, a communication system 238, a control system 248, one or more processors 242, and a data storage 244 on which program instructions 246 may be stored.

The power generation/conversion components 236 may include one or more generators driven by rotors, such as high-speed, direct-drive generators driven by the rotors 134A-D. For example, generator(s) driven by the rotors may be configured to operate at wind speeds of 11.5 meters per second and at a capacity factor that exceeds 60 percent (e.g., generating power more than 60% of the time, during a particular interval). The generator(s) may generate electrical power from 40 kilowatts to 600 megawatts.

In addition, conversion components 236 may be configured to convert electrical power generated by the generators to be suitable for transmission over the tether 220 (e.g., via conduction over the transmission components 222). Such conversion components may include AC to DC and/or DC to AC converters, for example. Converters may be used to convert AC voltage output from the generators to a DC voltage that is transmitted over the tether 220. Similarly, such converters may be used to convert DC voltage transmitted over the tether 220 to an AC voltage that drives a motor-generator to apply torque on a rotor (e.g., to generate thrust). In addition, converters may convert AC voltage output from the generator to a DC voltage and the DC voltage from each generator can then supply the DC power bus 234 located on the aerial vehicle 230. In addition, the power generation/conversion components 236 may include DC-DC converters for converting between different DC voltages. Further, the conversion components may also include transformers for scaling AC voltages to different levels.

The power bus 234 may provide power to the power-consuming components on the aerial vehicle 230, such as the processor(s) 242, control system 248, sensors 232, and communication system 238. In some implementations, the power bus 234 may include a bus bar or similar device having a DC capacitance, which may be charged/recharged via a charging system. The power bus 234 may be supplied at least partially by power generated on the aerial vehicle 230: that is, from electrical energy provided by rotor-driven generators in the power generation components 236. Power from each generator may be converted to DC (e.g., via rectifiers/converters associated with each generator, or perhaps pairs of generators), and then power from the various generators may jointly supply the DC power bus 234.

As another example, the power bus 234 may be supplied with electrical energy from one or more motors or engines for providing power to the aerial vehicle 230, perhaps on a back-up basis. In some implementations, the one or more motors or engines may be powered by a fuel, such as a combustible fuel. Fuel could be stored on the aerial vehicle 230 and delivered to the one or more motors or engines via one or more fluid conduits and then undergo combustion to convert the chemical energy in the fuel to mechanical or electrical energy as necessary. In some implementations, the power bus 234 may be implemented in whole or in part by components in the ground station 210. For example, a power supply located on the ground station 210 may charge a battery on the aerial vehicle 230 by transmitting power over the tether 220. Such a charging system may further include an inductive charging system and/or one or more solar panels on the aerial vehicle 230 and/or ground station 210.

The power generation/conversion components 236 in the aerial vehicle 230 may further include a motor drive coupled between the DC power bus 234 and the motor-generator. The motor drive can be configured to draw energy from the DC bus for the motor-generator to use to move the propeller and thereby generate thrust on the aerial vehicle 230. Additionally, the motor drive can be configured to supply the DC power bus 234 with electrical energy generated via the motor-generator from movement of the propeller. The motor drive may, for example, include voltage rectifier(s) and/or inverter(s), for converting between AC and DC voltages. Moreover, the motor drive may be configured to operate in accordance with command/control signals, such as provided by the control system 248 and/or communication system 238 so as to effect a desired flight path and/or wind power generation operation mode of the aerial vehicle 230.

The sensors 232 may include a range of different avionics, navigation, and/or power system sensors. For example, the sensors 232 may include a global positioning system (GPS) receiver, which may provide geolocation coordinates of the aerial vehicle 230. The sensors may additionally or alternatively include an inertial measurement unit (IMU), such as an accelerometer and/or gyroscope, which may be used to determine an orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. Moreover, a magnetometer may provide data indicative of an orientation and/or location of the aerial vehicle 230 with respect to the Earth's magnetic field. As another example, the sensors 232 may include one or more wind sensors (e.g., pitot tubes or the like), configured to detect relative wind at the aerial vehicle 230 and/or a pressure sensor or barometer that can be used to determine altitude of the aerial vehicle 230. Other examples of sensors may also be included, including sensors related to the operation modes and/or conditions of the power bus 234 and/or the power generation/conversion components 236.

The control system 248 can function to regulate and/or control the operation of the aerial vehicle 230 in accordance with instructions from the ground station 210 or a central command station and/or based on information output from the sensors 232. The control system 248 may therefore be configured to operate various airfoils and other features on the aerial vehicle that adjust the flight of the aerial vehicle (e.g., the control surfaces on the aerial vehicle 130 described in connection with FIG. 1). In some cases, the controller 248 may be configured to operate semi-autonomously to cause the aerial vehicle 230 to fly along a predetermined flight path (e.g., the path 150 described in connection with FIG. 1). The control system 248 may be implemented by components in whole or in part on the aerial vehicle 230 and/or by remotely located components in communication with the aerial vehicle 230, such as components located at the ground station 210 that communicate via the communication link 224. The control system 248 may be implemented by mechanical systems and/or with hardware, firmware, and/or software. As one example, the control system 248 may take the form of program instructions 246 stored on a non-transitory computer readable medium (e.g., the data storage 244) and a processor (or processors) 242 that executes the instructions.

Moreover, as noted, the aerial vehicle 230 may include a communication system 238. The communication system 238 may be similar in function to the communication system 218 in the ground station 210. The aerial vehicle 230 may communicate with the ground station 210, other aerial vehicles, and/or other entities (e.g., a command center) via the communication system 238 in accordance with various wireless and/or wired communication protocols and/or interfaces.

III. AC Power Transmission Over the Tether

The example AWT systems described above in connection with FIGS. 1 and 2 are connected to the ground station by a tether that is used to transmit electrical energy between the AWT and the ground station. In practice, while the AWT is used to generate electrical energy, the tether may be used to transmit power from the AWT to the ground station. While the AWT is used to generate thrust, such as during take-off and/or landing, the tether may be used to transmit power from the ground station to the AWT. FIGS. 3-4 provide examples in which high voltage; high frequency AC electrical signals are used to transmit power between the aerial vehicle and the ground station over the tether. As described further below, the aerial vehicle and the ground station each include transformers to scale the voltage on the tether to a high value and thereby reduce transmission losses over the tether. The aerial vehicle includes an AC to DC converter that converts the AC voltage on the tether to/from a DC voltage on a DC power bus on the aerial vehicle. The converter handles AC signals to/from the transformer, which allows the converter to operate at a voltage level determined by the transformer winding ratio.

The present disclosure provides for two different techniques to transmit AC on the tether while mitigating switching losses in the AC/DC converter. In one example, a DC current source, rather than a DC voltage source, is coupled to the AC/DC converter. Upon reversing polarity of the current source, via switches in the converter, the voltage in the tether capacitance ramps to reflect the reversed polarity. The tether capacitance acts to slew the voltage on the tether in response to each switching event using the tether capacitance as a buffer to charge/discharge until the current sources are balanced. The tether capacitance can thereby help avoid sudden voltage transitions and related switching losses. During the time between voltage transitions the tether can transmit DC current (and power) along the tether achieving a high tether utilization in terms of conduction loss and voltage stress compared to sinusoidal AC waveforms. In another example, the tether capacitance is used to create a resonant network configured to oscillate at the driving frequency. For instance, an inductor may be coupled to the tether such that the tether/inductor combination has a resonant frequency determined by both the tether capacitance and the inductor, similar to a resonant tank circuit. When supplied with an oscillating voltage, the tether voltage can then undertake a sinusoidal oscillation.

A. Current Sources Driving Tether Capacitance

Figure 3A:
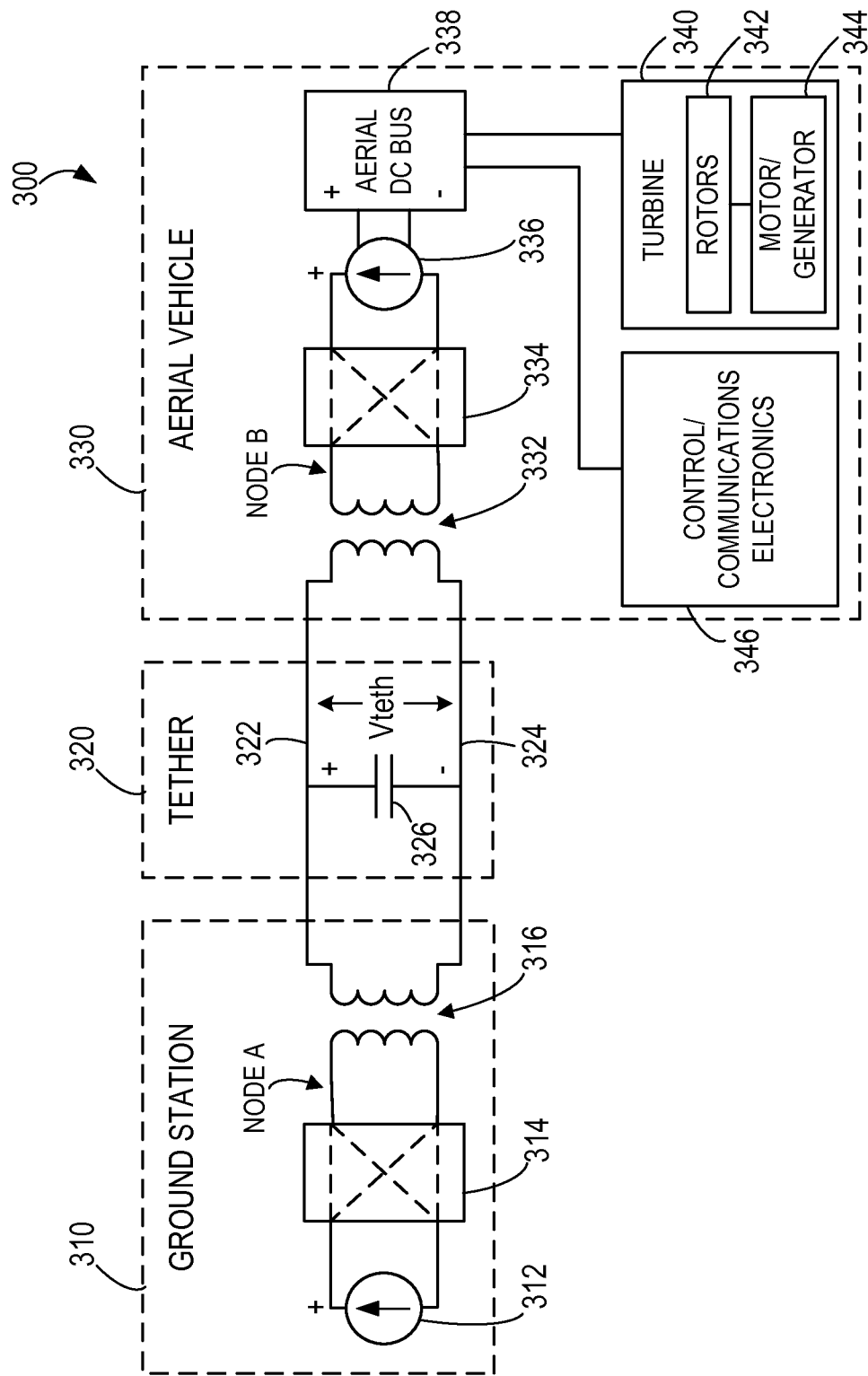
FIG. 3A is a simplified block diagram that connects the aerial vehicle to the ground station using AC signals, according to an example embodiment.

FIG. 3A is a simplified block diagram of a system 300 that connects the aerial vehicle 330 to the ground station 310 using AC signals, according to an example embodiment. The system 300 includes a ground station 310, a tether 320, and an aerial vehicle 330. The system 300, the components therein, and the operation thereof, can be similar to either of the AWT systems described above in connection with FIGS. 1 and 2.

The aerial vehicle 330 includes an AWT 340, which includes rotors 342 coupled to a motor-generator 344. The AWT 340 operates to alternately generate electricity and generate thrust. During electricity generation, the rotors 342 interact with the atmosphere, which generates torque on a shaft coupled to the generator, and the rotation of the shaft causes a winding in the generator to move with respect to a magnetic field, which induces an electromotive force on the winding and thereby generates electricity. During thrust generation, a current is applied to windings in the motor-generator 344, which interact with a magnetic field to apply torque to the shaft, which then rotates the rotors 342 and thereby produces thrust on the aerial vehicle 330.

The AWT 340 is coupled to an aerial DC bus 338, which may include one or more rechargeable batteries or other energy storage devices. The aerial DC power bus 338 receives power from the AWT 340 during power generation. For example, AC voltage generated by the AWT 340 may be rectified/converted to a DC voltage, and then applied to the DC power bus 338. In addition, the DC power bus can output power to the AWT 340 during thrust generation. For example, the motor-generator 344 may draw current from the DC bus 338, which causes the motor-generator 344 to apply torque to the rotors 342, and thereby generate thrust. In some examples, the current from the DC bus 338 that is applied to the motor-generator may be converted to AC.

In some examples, there may be turbines aboard the aerial vehicle 330, perhaps as many as eight propellers distributed across the winged structure of the aerial vehicle 330. As such, the aerial vehicle 330 may also have multiple AC/DC converters for converting energy between the voltage of the aerial DC bus 338 and the individual motor-generators. In some cases, each turbine may have a separate AC/DC converter, which may then jointly supply the aerial DC bus 338. In some cases, groups of turbines may share common AC/DC converters, and the grouped AC/DC converters can then jointly supply the aerial DC bus. For instance, the aerial vehicle 330 may include multiple pylons that each include two (or perhaps more) propellers and motor-generators, and a single AC/DC converter can be provided for each pylon. Further still, some embodiments may include more than one aerial DC bus (e.g., one half of all turbines are connected to one DC bus, the other half are connected to another DC bus). The various techniques for distributing AC/DC converters amongst multiple motor-generators may also allow for distributing mass throughout the aerial vehicle (e.g., by situating each AC/DC converter proximate its corresponding motor-generator). In addition, the arrangement enhances the redundancy and reliability of the system 300 by providing multiple AC/DC converters as opposed to a single one, which reduces the probability of a single point failure.

In addition, the aerial vehicle 330 includes control and communications electronics 346, which can also receive power from the aerial DC bus 338. The electronics 346 can include sensors, communications systems, controllers, processors, etc., configured to operate in coordination so as to operate the aerial vehicle 330 to take off, fly in a crosswind flight path, and land. The electronics 346 may include one or more of the avionics, navigation, communication, and/or control modules described above in connection with FIGS. 1 and 2, for example. A voltage converter, rectifier, and/or regulator may be provided to condition voltage from the DC bus 338 to be suitable as a power supply for the electronics 346. Moreover, in some examples, an entirely separate DC power source may be provided for powering the various power-consuming electronics 346 aboard the aerial vehicle 330, such as a rechargeable battery that is charged in whole in part without power generated by the AWT 340.

The tether 320 is connected to the ground station 310 and the aerial vehicle 330. The tether 320 includes a first conductor 322 and a second conductor 324. The two conductors 322, 324 may be implemented as a pair of wires or a coaxial cable, or another arrangement and may be formed of a conductive material, such as aluminum. The tether 320 may further include insulation and/or shielding so as to prevent electrical connections between the two conductors 322, 324 along the length of the tether 320.

The two conductors are configured to transmit power between the ground station 310 and the aerial vehicle 330 using AC signals on the two conductive wires 322, 324. For example, during power transmission the first wire 322 can have a periodically varying voltage with respect to the voltage on the second wire 324. The two conductors 322, 324 may have a capacitance 326, which may be due to the geometry of the two conductors in the tether 320. As shown in FIG. 3A, the voltage between the two conductors 322, 324 (and thus, across the capacitance 326) is referred to herein as Vteth. In particular implementations, the value of the capacitance 326 may be dependent on the particular geometry of the tether conductors 322, 324, and the total length of the tether 320.

In addition to the tether 320, the AC power transmission pathway from the ground station 310 to the aerial vehicle 330 (or from the aerial vehicle 330 to the ground station 310) includes components on the ground station 310 and the aerial vehicle 330.

The ground station 310 includes a current source 312, a bidirectional AC/DC converter 314, and a transformer 316. Similarly, the aerial vehicle 330 includes a transformer 332, a bidirectional AC/DC converter 334 and a current source 336. The transformers 316, 332 are each connected coupled to respective ends of the tether conductors 322, 324 to scale the voltage on the tether 320 in accordance with the winding ratios of the transformers 316, 332. Thus, the transformers 316, 332 may be used to create a relatively high voltage for transmission on the tether and thereby mitigate transmission losses. The transformers 316, 332 are each connected to the respective bidirectional AC/DC converters 314, 334. The converters 314, 334 convert AC voltage to/from the transformers 316, 332 to DC voltage. The converters 314, 334 are then each connected to respective current sources 312, 336. The current sources 312, 336 provide a driving source/sink of DC power by sourcing/sinking current, with the direction dependent on the direction of power flow.

The converters 314, 334 each include a pair of AC terminals, a pair of DC terminals, and a network of switches that selectively connect the AC terminals to ones of the DC terminals. The switches can be operated to alternately reverse polarity of the AC-side terminals with respect to the DC-side terminals. As shown in FIG. 3A, the converter 314 sends/receives AC voltage to/from the transformer 316 via terminals at node A; and the converter 334 sends/receives AC voltage to/from the transformer 332 via terminals at node B. In some examples, the switches in the AC/DC converters 314, 334 may be implemented by circuits with one or more transistors, thyristors, and/or diodes, etc.

When converting AC voltage to a DC voltage, the converter repeatedly reverses the polarity of the AC terminals with respect to the DC terminals to create a DC bias across the DC terminals. In one example, an incoming sinusoidal AC voltage can be switched twice per full cycle, such that the DC terminals receive a half-wave rectified voltage. As noted above, switching losses are mitigated by switching at or near zero voltage, which reduces the effect of switching voltages that dissipate energy in the switches in proportion to the square of the voltage across the switches. Thus, input AC waveforms may be switched at or near zero voltage crossings, which is referred to herein as zero voltage switching (ZVS). ZVS operation may be implemented using voltage sensors that operate control lines for the switches (e.g., transistors) so as to cause the switches to fire upon the voltage crossing zero and/or by auto-sensing circuitry, such as diodes configured to become forward-biased upon voltage crossing zero, etc. In other examples, AC voltages with a variety of different waveforms can be switched at a frequency related to the frequency of the AC waveform so as to create a DC bias on the DC terminals. Moreover, a capacitor or another high-frequency filtering component can optionally be connected across the DC voltage terminals to smooth the output voltage and reduce high-frequency noise in the DC voltage.

When converting DC voltage to an AC voltage, the converter repeatedly reverses the polarity of the DC terminals so as to create a periodically varying voltage across the AC terminals. For example, the converter can reverse the polarity of the DC terminals with respect to the AC terminals, and then revert back to complete a given cycle. The frequency of the resulting AC waveform may then depend on the frequency of such switching operations.

The conductive paths 322, 324 of the tether 320, the transformers 316, 332, the converters 314, 334, and the current source/sinks 312, 336 combine to electrically couple the power generation (and consumption) components in the aerial vehicle 330 and the power distribution components in the ground station 310. The combined electrical linkage (e.g., the components on the ground station 310, the tether 320, and/or the aerial vehicle 330) may therefore be referred to herein as a bidirectional power transmission path.

While the tether 320 (and associated transmission path components in the ground station 310 and aerial vehicle 330) allows for bidirectional power flow (i.e., from the ground station 310 to the aerial vehicle 330 or from the aerial vehicle 330 to the ground station), the following section refers to an example in which power is transmitted from the ground station 310 to the aerial vehicle 330.

Figure 3B:
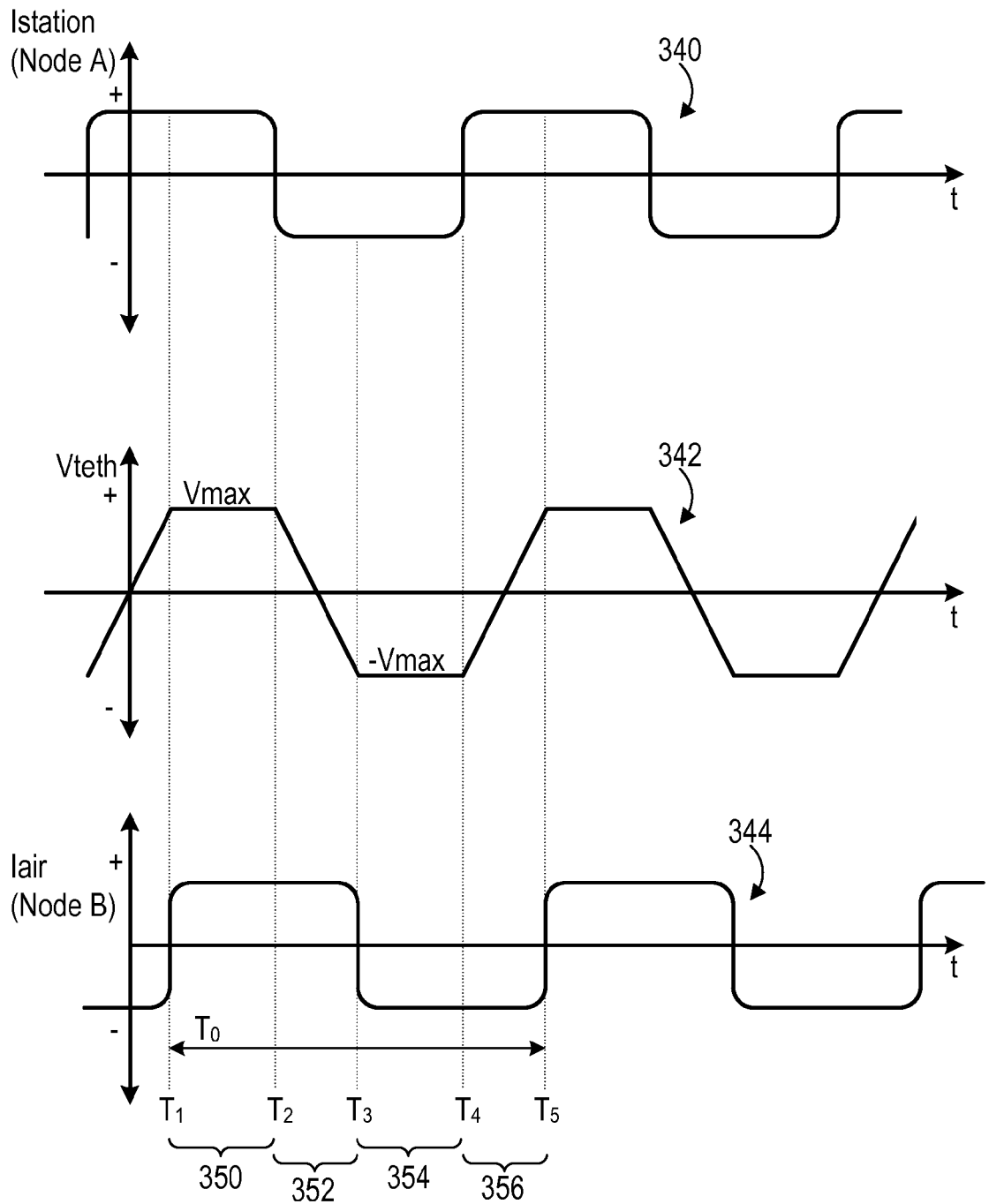
FIG. 3B is a graphical representation of tether voltage and currents in the system shown in FIG. 3A.

FIG. 3B is a graphical representation of tether voltage Vteth and currents in the system shown in FIG. 3A. The waveform 340 depicts current Istation, at node A in the ground station 310. The waveform 344 depicts current Iair, at node B in the aerial vehicle 330. The waveform 342 depicts the tether voltage Vteth, which is the voltage across the tether capacitance 326.

The current Istation oscillates between positive and negative due to the current source 312 being repeatedly switched by the converter 314 to reverse polarity. Upon reversing polarity of the current source 312, via the converter 314, the voltage on the tether capacitance 326 (i.e., Vteth) slews from positive to negative (or negative to positive). The change in current direction (e.g., due to inverting the polarity of the current source 312) gradually charges/discharge the tether capacitance 326 while matching currents on the tether 320. The voltage Vteth can then ramp from a maximum voltage Vmax to a minimum voltage −Vmax. The tether capacitance 326 can thereby smooth the voltage during transition from reversing polarity of the current sources 312, 336. Repeating the cycle results in a trapezoidal waveform on the tether voltage Vteth, as shown in FIG. 3B, by way of example. Such a trapezoidal waveform may substantially mitigate high frequency harmonics.

During the time between voltage transitions (e.g., the intervals 350, 354), the tether 320 can transmit DC current (and power) along the tether 320 achieving a high tether utilization in terms of conduction loss and voltage stress compared to sinusoidal AC waveforms. During periods in which the Vteth waveform ramps between voltages (e.g., the intervals 352, 356), the current sources 312, 336 may oppose one another while the tether capacitance 326 slews the voltage on the tether 320 between extremes.

For example, at time $T_1$, both current sources 312, 336 may be connected with a common positive polarity (via operation of respective switches in converters 314, 334). The tether voltage Vteth can be at a maximum voltage +Vmax, and the current source 312 can transmit power at full tether utilization up the tether 320 to the current source 336 (via the transformer 332 and converter 334). During an interval 350 beginning with time $T_1$, the current source 336 in the aerial vehicle 330 is charged by the received current, which may be near maximum capacity.

At time $T_2$, the converter 314 may reverse polarity of the current source 312, which causes Istation to switch from positive to negative. The tether voltage Vteth can then begin ramping from +Vmax, to −Vmax by charging/discharging the tether capacitance 326. At time $T_3$, the tether voltage Vteth reaches −Vmax, and the airborne current source 336 can reverse polarity (by operation of the converter 334). During the interval 352 from time $T_2$ to time $T_3$, the polarities of the current sources 312, 336 may oppose one another, and cause the tether voltage Vteth to slew from +Vmax, to −Vmax.

At time $T_3$, the converter 334 may reverse polarity of the current source 336, which causes Iair to switch from positive to negative, and the two current sources 312, 336 are once again connected with a common polarity. During an interval 354 from time $T_3$ to time $T_4$, the tether voltage Vteth can be at a minimum voltage −Vmax, and the current source 312 can transmit power at full tether utilization up the tether 320 to the current source 336 (via the transformer 332 and converter 334).

At time $T_4$, the converter 314 may reverse polarity of the current source 312 again, which causes Istation to switch from negative to positive. The tether voltage Vteth can then begin ramping from −Vmax, to +Vmax by charging/discharging the tether capacitance 326 during the interval 356 from time $T_2$ to time $T_3$. At time $T_5$, the tether voltage Vteth reaches +Vmax, and the airborne current source 336 can reverse polarity (by operation of the converter 334), which completes the AC cycle of the resulting trapezoidal waveform with a period $T_0$ (and frequency $T_0^{-1}$).

To send power back down the tether 320, the order of current switching in the current source inverters (i.e., the converters 314, 334) are driven to draw power from the aerial DC bus 338 to supply power to the ground station 310. In particular, the converter 334 can be operated to periodically reverse polarity of the current source 336 in accordance with a desired frequency. The converter 314 can then be operated to switch the polarity of the current supplied to the station current source 312 in response to the tether voltage Vteth reaching respective maximum and minimum voltages (e.g., similar to the operation of the converter 334 described above). The result is a trapezoidal voltage waveform on the tether 320, with full utilization of the tether to transmit power down the tether 320 while the voltage is at respective maximum and minimum values, and the ground station current waveform (at node A) lagging the aerial vehicle current waveform (at node B).

B. Resonant Network Including Tether Capacitance

Figure 4A:
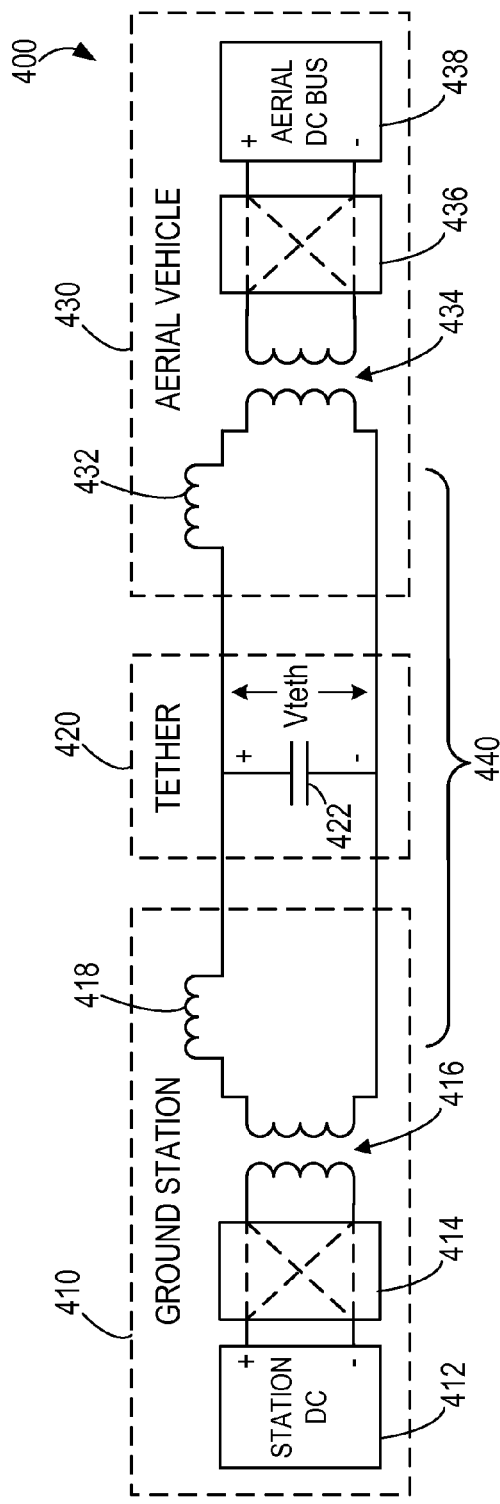
FIG. 4A is a simplified block diagram that connects the aerial vehicle to the ground station using AC signals via a resonant network, according to an example embodiment.

FIG. 4A is a simplified block diagram of a system 400 that connects the aerial vehicle 430 to the ground station 410 using AC signals via a resonant network 440 according to an example embodiment. The system 400 includes a ground station 410, a tether 420, and an aerial vehicle 430.

The system 400, the components therein, and the operation thereof, can be similar to either of the systems described above in connection with FIGS. 1-3, or combinations thereof. For instance, the aerial vehicle 430 includes a transformer 434, a converter 436, and an aerial DC bus 438, which each may be the same as (or similar to) the transformer 332, converter 334, and aerial DC bus 336, respectively, described above in connection with FIGS. 3A and 3B. Moreover, while not shown in FIG. 4A, the aerial DC bus 438 may be used to both power AWT(s) and other system electronics on the aerial vehicle 430 and also may be charged by power generated in the AWT(s). The tether 420 may include two conductive pathways insulated from one another, and having an internal tether capacitance 422 between the two conductive pathways similar to the tether 320 described above in connection with FIGS. 3A and 3B, in which the tether capacitance 326 was exhibited between the conductive pathways 322, 324. Also, the ground station 410 includes a DC voltage source 412, a converter 414, and a transformer 416, which may be the same as (or similar to) the converter 314 and transformer 316, respectively, described above in connection with FIGS. 3A and 3B.

However, unlike the system 300 of FIGS. 3A and 3B, the system 400 in FIG. 4A includes a resonant network 440 that causes AC electrical signals transmitted through the tether 420 to undergo resonant oscillation. In particular, one or more inductors are connected to the tether 420 such that the resonant network 440 has a resonant frequency defined by the tether capacitance 422 and the inductor(s). As shown in FIG. 4A, one inductor 418 may be connected to a conductive path of the tether 420, between the tether 420 and the transformer 416 in the ground station 410. In addition, another inductor 432 may be connected to a conductive path of the tether 432, between the tether 420 and the transformer 434 in the aerial vehicle 430.

The inductor(s) 418, 432 and the tether capacitance 422 cause the electrical signals transmitted through the tether to oscillate due to the oscillatory transition of energy stored in the inductors 418, 432 to the capacitor 422. For example, the resonant network 440 may have a resonant frequency fres similar to an LC tank circuit, such as $f_{res} \approx (LC)^{-1/2}$, although other examples are possible in which the resonant frequency are defined, at least in part, based on a combination of the tether capacitance 422 and the inductance of the inductor(s) 418, 432. Moreover, the resonant frequency of the resonant network 440 may be tuned by selecting values of the inductor(s) 418, 432.

Figure 4B:
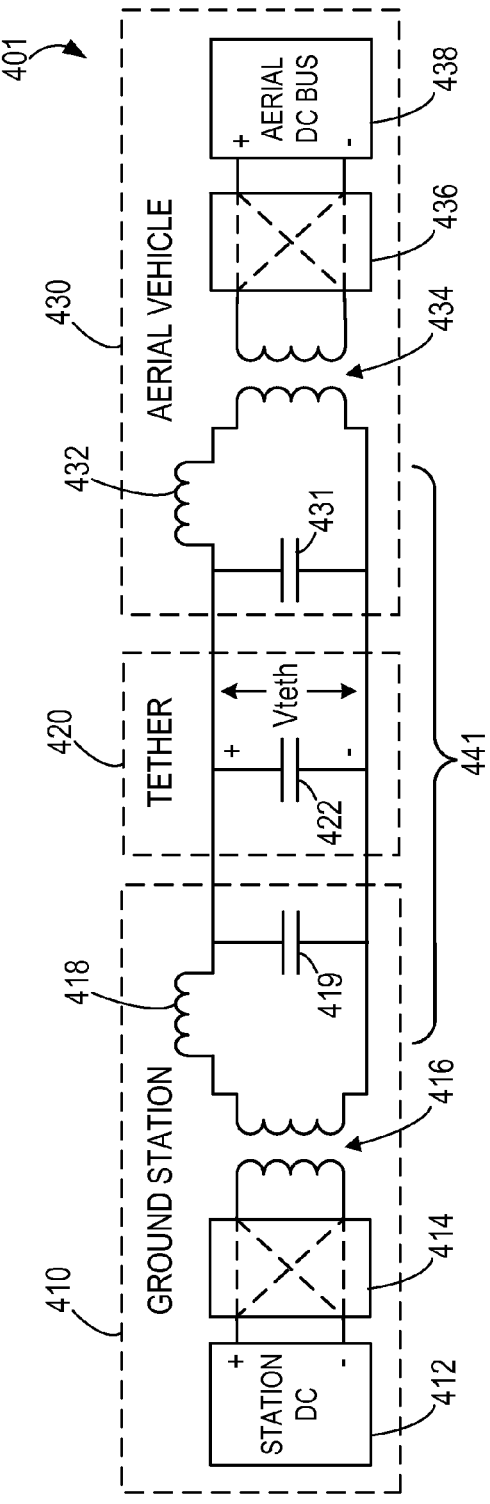
FIG. 4B is a simplified block diagram that connects the aerial vehicle to the ground station using AC signals via another resonant network, according to an example embodiment.

FIG. 4B is a simplified block diagram of a system 401 that connects the aerial vehicle 430 to the ground station 410 using AC signals via another resonant network 441, according to an example embodiment. In the resonant network 441, the tether capacitance 422 is supplemented by additional capacitors 419, 431 connected in parallel with the tether capacitance 422. For example, as shown in FIG. 4B, the capacitor 419 may be connected between the two conductive paths of the tether 420, in the ground station 410. And the capacitor 431 may be connected between the conductive paths of the tether 420, in the aerial vehicle 430. The additional capacitors 419, 431 can be used to further tune the resonant frequency of the resonant network 441. Moreover, the additional capacitors 419, 431 can reduce the effect of variations and/or uncertainties in the tether capacitance (e.g., such as if the additional capacitors 419, 431 have a greater combined capacitance than the tether capacitance 422).

Due to the resonant network 440 (or 441), upon providing an AC waveform from one of the converters 414, 436, at a frequency near the resonant frequency, the tether voltage Vteth oscillates in a sinusoidal fashion. As a result of the sinusoidal waveform of the tether voltage Vteth, the systems 400, 401 can each be driven by the voltage source 412, rather than current sources as in the system 300. In practice, the resonant sinusoidal oscillation on the resonant network 440 (or 441) causes the tether voltage Vteth to cyclically cross through zero volts (e.g., while energy in the resonant network 440, 441 shifts to the inductors 418, 432). The respective converters 414, 436 can then be driven to operate their respective switches while the voltage crosses zero and thereby substantially mitigate switching losses.

In some cases, the reactance of the resonant networks 440, 441 may cause the waveform of the voltage at the ground station 410 (e.g., between the converter 414 and transformer 416) to lead the tether voltage Vteth. Similarly, the waveform of the voltage at the aerial vehicle 430 (e.g., between the transformer 434 and converter 436) may lag the tether voltage Vteth. The respective lag/lead offsets between the waveforms at the ground station 410 and aerial vehicle 430 may be accounted for by the respective converters 414, 436 so as to mitigate switching losses.

To send power back down the tether 420, from the aerial DC bus 438 to supply power to the ground station 410, the phase and amplitude of the ground station and aerial vehicle sinusoids can be adjusted. In practice, the converter 436 in the aerial vehicle 430 can be operated to periodically reverse polarity of the aerial DC bus 438 in accordance with a frequency corresponding to the resonant frequency of the transmission network 440 (or 441). The converter 414 can then be operated to switch the polarity of the voltage supplied to the station voltage source 412 in response to the tether voltage Vteth passing through zero (e.g., similar to the operation of the converter 436 described above). In practice, the switch in power transmission direction may be implemented as a phase shift and/or amplitude shift in one or both of the converters 414, 436.

IV. Example Operations

Figure 5A:
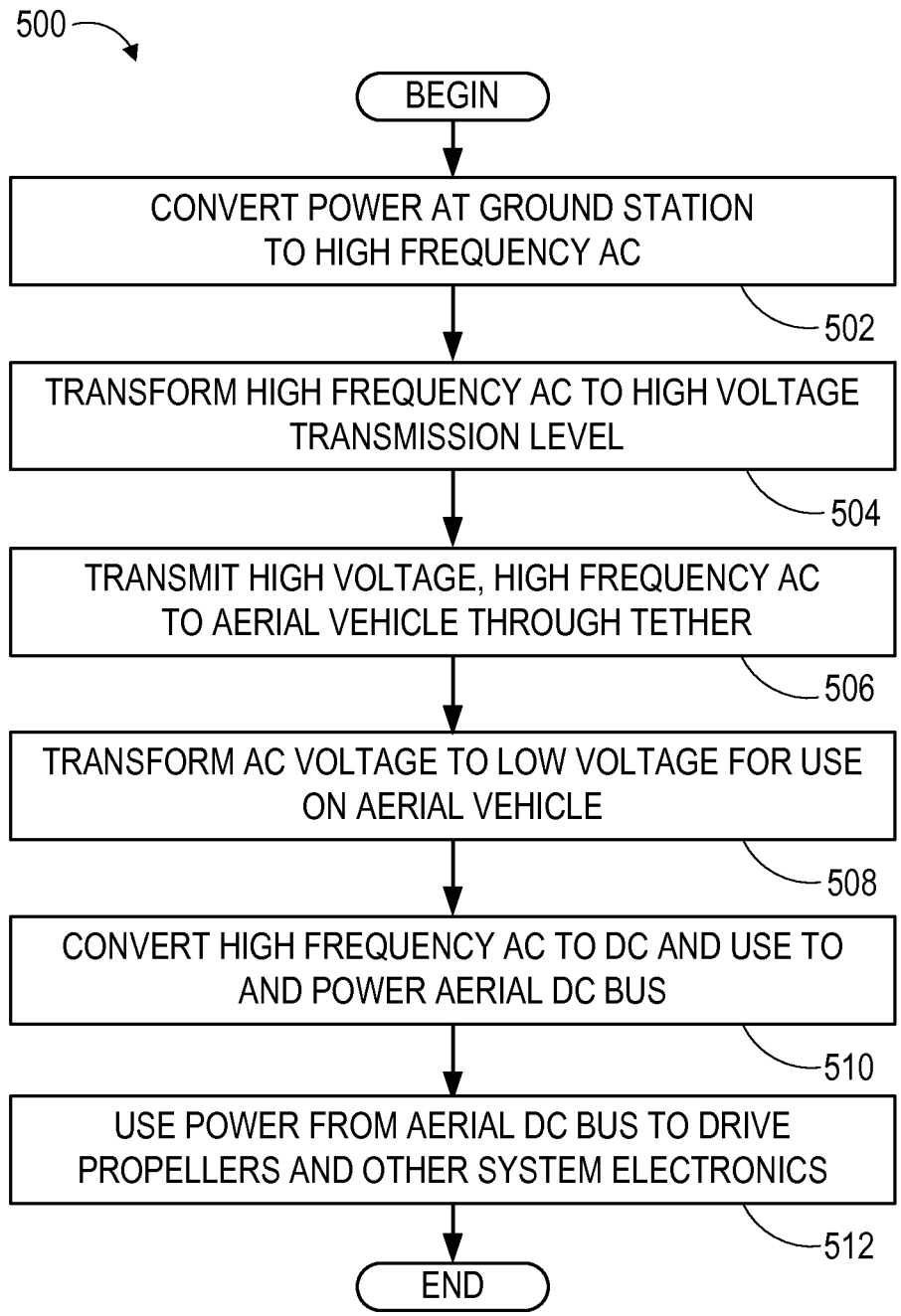
FIG. 5A is a flowchart of an example process for powering a tethered aerial vehicle.

FIG. 5A is a flowchart of an example process 500 for powering a tethered aerial vehicle. In some embodiments, the tethered aerial vehicle can include an AWT mounted thereon that alternately generates power from wind and generates thrust. The aerial vehicle can also be coupled to a ground station via a tether. For example, the aerial vehicle may be similar to any of the aerial vehicles described above in connection with FIGS. 1-4 above. During thrust generation, the AWT can draw power to cause a propeller to rotate, which then provides thrust to the aerial vehicle. To power the propeller, and perhaps other power-consuming systems on the aerial vehicle (e.g., sensors, controllers, communication, navigation, avionics equipment, etc.), the ground station may transmit power to the aerial vehicle over the tether, which may be performed by the process 500.

At block 502, power at the ground station can be converted to high frequency AC electrical signals. For example, the ground station may receive power through a connection to an electrical distribution and transmission network (e.g., the electrical grid). The ground station may receive power from the grid via wires carrying polyphase AC electrical signals, for example. For example, power may be received by AC electrical signals oscillating at about 50 hertz or at about 60 hertz and at a voltage level employed for transmission and/or distribution over the electrical grid (e.g., 240 volts AC, 5 kilovolts AC, etc.). The converter may operate by rectifying/converting the incoming electrical signals to a DC voltage, and then using an AC/DC converter (e.g., an inverter) to produce an AC voltage at the desired frequency (e.g., about 5 kilohertz). The converter may repeatedly reverse polarity of the DC voltage with respect to AC output terminals so as to provide an AC waveform that oscillates at a desired frequency on the AC output terminals.

At block 504, the AC voltage from the converter can be transformed to a high voltage transmission level. For example, a transformer similar to the transformers included in the ground stations described above in FIGS. 3 and 4 can receive the high frequency AC from the converter, and scale the AC to a higher voltage level based on the winding ratio of the transformer. The output from the transformer is then a high voltage, high frequency AC electrical signal that is suitable for transmission through the tether. In some examples, the output from the transformer may be an AC waveform with a frequency of about 5 kilohertz and an AC voltage of about 4 kilovolts. In another example, the frequency may exceed about 2 kilohertz and the AC voltage may exceed about 2 kilovolts.

At block 506, the high voltage, high frequency AC can be transmitted to the aerial vehicle through the tether. The tether may be similar to any of the tethers coupling ground stations to aerial vehicles described above in connection with FIGS. 1-4. The tether can include a first conductive path and a second conductive path (e.g., by multiple insulated wires surrounding a strain-bearing core). The AC waveform output from the transformer can be applied across the multiple conductive paths, which transmits the AC electrical signals to the aerial vehicle. The tether and the resistance of the conductive paths can be configured to carry high voltage, high frequency AC electrical signals.

In addition, the two conductive paths may be arranged such that, at high frequency, the tether exhibits an internal capacitance between the two conductive paths. In some cases, the cross-sectional area of the two wires and/or the geometry of the two conductive paths along the tether may be arranged to achieve particular electrical load-bearing demands or other performance criteria. In some examples, tether parameters may be selected based on a compromise between minimizing the tether resistance (e.g., by increasing the cross-sectional areas of the conductive paths) and minimizing the tether weight (e.g., by decreasing the cross-sectional areas). In some examples, the high voltage (transmission level voltage) may be selected based on a compromise between minimizing the tether current (e.g., by increasing the transmission level voltage) and minimizing the requirements on tether insulation weight (e.g., by decreasing the transmission level voltage).

At block 508, the high voltage, high frequency AC voltage can be transformed to a lower voltage by a transformer on the aerial vehicle. The transformer on the aerial vehicle may be configured to scale the transmission level voltage to a voltage level that is suitable for handling with a converter also on the aerial vehicle. For example, the transformer on the aerial vehicle may have a winding ratio configured to transform between about 4 kilovolts (example transmission level voltage) to about 1 kilovolt (example converter level voltage). Moreover, because the AC voltage is at high frequency (e.g., about 5 kilohertz), the magnetic components of the transformer included on the aerial vehicle can be much smaller than at lower frequencies (e.g., 60 hertz), for the same power.

At block 510, the scaled high frequency AC output from the transformer can be converted to DC and used to power an aerial DC bus. For example, the converter may include multiple switches configured to periodically reverse the polarity of the input AC terminals with respect to DC terminals, such that the output DC terminals have a DC bias. In some examples, the converter may employ zero voltage switching by switching at or near times in the AC waveform when the voltage crosses zero. Zero voltage switching can help mitigate losses associated with energy dissipated across the switches while switching at non-zero voltages.

At block 512, the power supplied to the aerial DC bus can be used by systems on the aerial vehicle. For example, power can be drained from the aerial DC bus to operate propellers (e.g., by applying current to one or more motor-generators coupled to the propellers). In another example, power can be drained from the aerial DC bus to power other power-consuming system electronics, such as controllers, navigation, communication, sensors, avionics instruments, etc. In some examples, the other electronics on the tethered aerial vehicle are powered by a lower voltage than the voltage transmitted on the tether or the voltage desired to drive the propellers. As such, the voltage on the aerial DC bus may be converted to a suitable voltage to drive the electronics systems. In some examples, moreover, power to drive the system electronics may be transmitted through the tether via a separate conductive path and is already at an appropriate DC voltage to drive the system electronics. Further still, in some examples, power to drive the other system electronics may be transmitted on a separate conductor from the power to drive the propellers, and is at a high DC voltage (e.g., to minimize the current transmitted on the separate conductor).

Figure 5B:
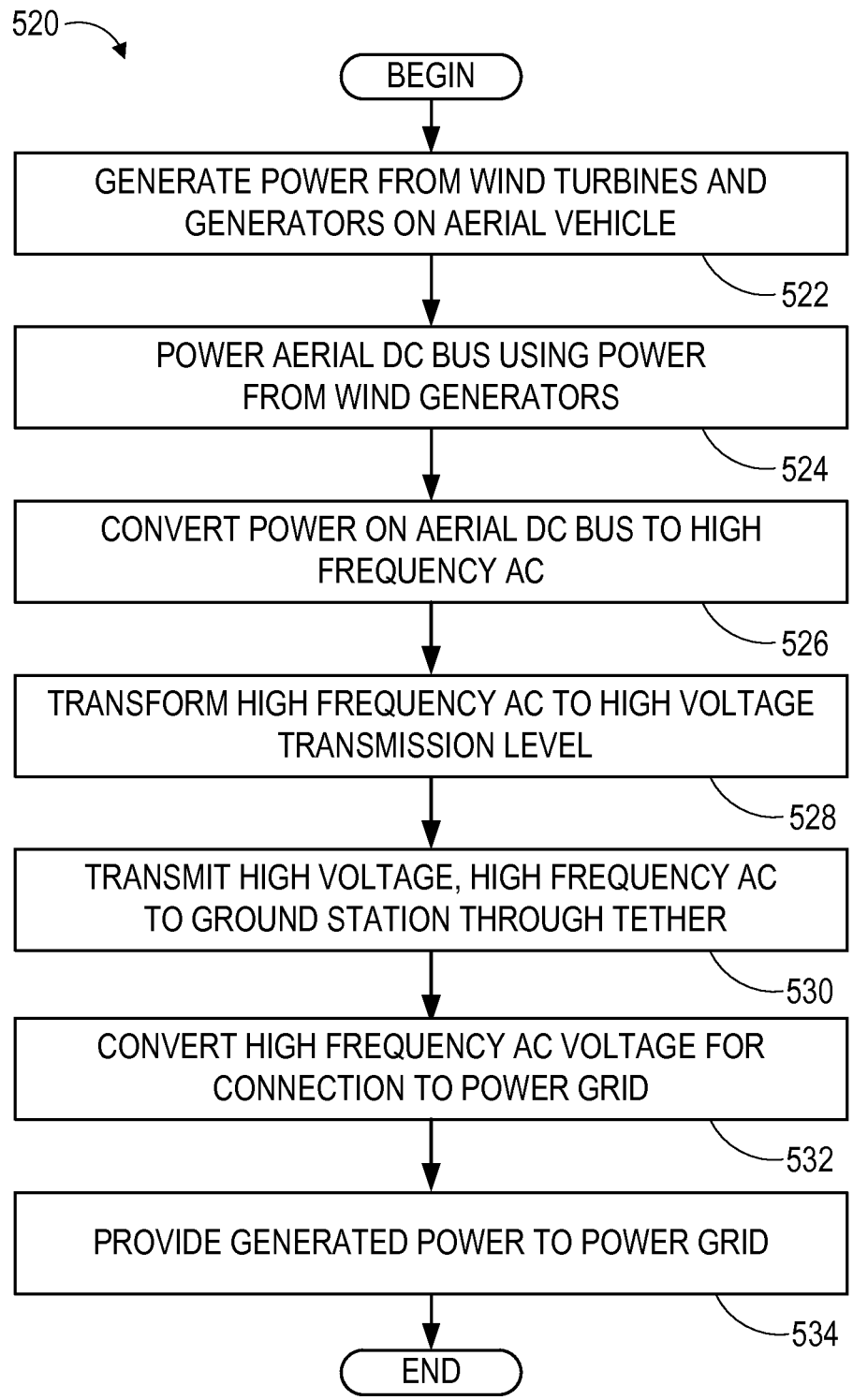
FIG. 5B is a flowchart of an example process for distributing power generated by an airborne wind turbine on a tethered aerial vehicle.

FIG. 5B is a flowchart of an example process 520 for distributing power generated by an airborne wind turbine on a tethered aerial vehicle. In some embodiments, the tethered aerial vehicle can include an AWT mounted thereon that alternately generates power from wind and generates thrust. The aerial vehicle can also be coupled to a ground station via a tether, similar to any of the systems described above in connection with FIGS. 1-4 above. During power generation, the AWT can generate power from wind-induced motion of a propeller, which kinetic energy can then be converted to electrical energy by a motor-generator, and the generated electrical energy can then be transmitted through the tether and distributed to an electrical distribution grid via the ground station.

At block 522, electrical power can be generated using wind turbine(s) on the aerial vehicle. For example, the aerial vehicle may operate in crosswind flight and the relative motion of the aerial vehicle and the surrounding atmosphere (e.g., due in part to wind) may cause the airfoils on the rotors/propellers to exert a torque on a shaft coupled to the motor-generator. Within the motor-generator, the shaft can then turn magnets and/or windings with respect to one another to induce an alternating voltage at output terminals of the motor-generator.

At block 524, power generated using the wind turbine(s) can be used to supply an aerial DC bus. For example, the output of the wind generators may be a DC voltage (or may be rectified/converted to DC) that can be applied to the aerial DC bus. The aerial DC bus can then be used to provide power to the various system electronics on the aerial vehicle. Power from the aerial DC bus can also be sent back to the ground station, by transmitting power through the tether with a high voltage, high frequency AC voltage.

At block 526, power from the aerial DC bus can be converted to high frequency AC electrical signals. The converter may include multiple switches that repeatedly reverse polarity of the DC voltage (from the aerial DC bus) with respect to AC output terminals so as to provide an AC waveform that oscillates at a desired frequency on the AC output terminals. The resulting AC electrical signals may have a frequency of about 5 kilohertz, for example.

At block 528, the high frequency AC output from the converter can be transformed to a transmission level voltage. For example, the transformer may output AC electrical signals at a voltage of about 4 kilovolts. Similar to the tradeoffs discussed above in connection with blocks 504 and 506 of the process 500, the transmission level voltage (and the corresponding winding ratio of the transformer) may be selected based on various tradeoffs so as to reduce the current transmitted through the tether, among other factors.

At block 530, the high voltage, high frequency AC voltage can be transmitted to the ground station through the tether. The tether may be similar to any of the tethers coupling ground stations to aerial vehicles described above in connection with FIGS. 1-4. The tether can include a first conductive path and a second conductive path (e.g., by multiple insulated wires surrounding a strain-bearing core). The AC waveform output from the transformer can be applied across the multiple conductive paths, which transmits the AC electrical signals to the ground station.

At block 532, the high voltage, high frequency AC voltage transmitted through the tether can be converted for connection to an electrical distribution network (e.g., power grid). Block 532 may involve transforming the AC voltage to a lower voltage level, then converting to DC, then converting to another AC form suitable for distribution on the grid (e.g., a 60 hertz polyphase waveform synchronized with the grid). The conversion in block 532 may be implemented using a combination of inverters, transformers, etc. as necessary.

At block 534, the converted electrical signals can be provided to the grid, thereby distributing the power generated by the AWT on the aerial vehicle to power consumers with access to the grid.

Figure 6:
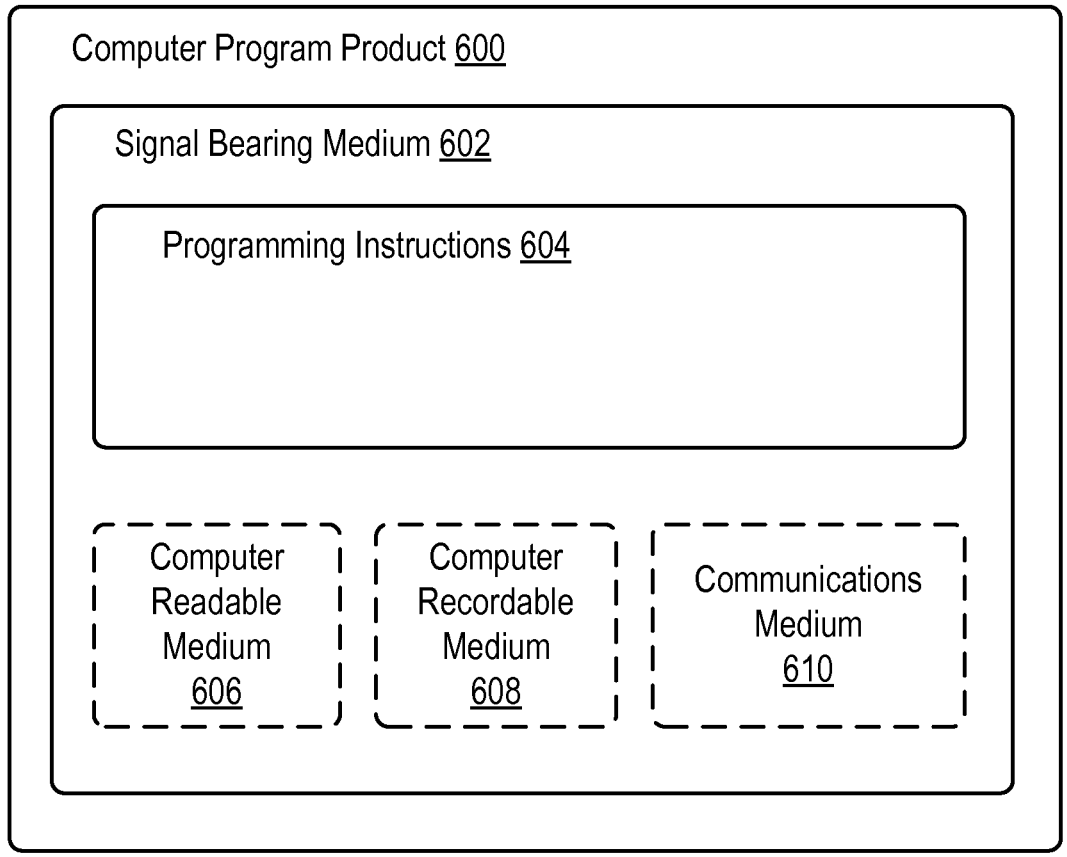
FIG. 6 depicts a non-transient computer program product, according to an example embodiment.

FIG. 6 depicts a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

As noted above, in some embodiments, the disclosed techniques can be implemented by computer program instructions encoded on a non-transitory computer-readable storage media in a machine-readable format, or on other non-transitory media or articles of manufacture. FIG. 6 is a schematic illustrating a conceptual partial view of an example computer program product 600 that includes a computer program for executing a computer process on a computing device, arranged according to at least some embodiments presented herein, including the processes shown and described in connection with FIGS. 5A and 5B.

In one embodiment, the example computer program product 600 is provided using a signal bearing medium 602. The signal bearing medium 602 may include one or more programming instructions 604 that, when executed by one or more processors may provide functionality or portions of the functionality described above with respect to FIGS. 1-5. In some examples, the signal bearing medium 602 can include a non-transitory computer-readable medium 606, such as, but not limited to, a hard disk drive, a Compact Disc (CD), a Digital Video Disk (DVD), a digital tape, memory, etc. In some implementations, the signal bearing medium 602 can be a computer recordable medium 608, such as, but not limited to, memory, read/write (R/W) CDs, R/W DVDs, etc. In some implementations, the signal bearing medium 602 can be a communications medium 610, such as, but not limited to, a digital and/or an analog communication medium (e.g., a fiber optic cable, a waveguide, a wired communications link, a wireless communication link, etc.). Thus, for example, the signal bearing medium 602 can be conveyed by a wireless form of the communications medium 610.

The one or more programming instructions 604 can be, for example, computer executable and/or logic implemented instructions. In some examples, a computing device is configured to provide various operations, functions, or actions in response to the programming instructions 604 conveyed to the computing device by one or more of the computer readable medium 606, the computer recordable medium 608, and/or the communications medium 610.

The non-transitory computer readable medium 606 can also be distributed among multiple data storage elements, which could be remotely located from each other. The computing device that executes some or all of the stored instructions can be a microfabrication controller, or another computing platform. Alternatively, the computing device that executes some or all of the stored instructions could be remotely located computer system, such as a server.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A system comprising:
an aerial vehicle;
a generator disposed in the aerial vehicle to generate power;
a converter disposed in the aerial vehicle to convert the generated power to a high frequency AC voltage;
a transformer disposed in the aerial vehicle to transform the high frequency AC voltage to a high voltage transmission level;
a ground station coupled to the aerial vehicle; and
a tether to couple the aerial vehicle with the ground station, wherein the tether transmits the transformed high frequency AC voltage to the ground station, wherein the tether includes a first conductive path and a second conductive path, and wherein the tether transmits the high frequency AC voltage by the first conductive path conducting the high frequency AC voltage with respect to the second conductive path.

2. The system of claim 1, further comprising:
a wind turbine situated on the aerial vehicle, wherein the generator is electrically coupled to the wind turbine to generate the power.

3. The system of claim 1, wherein the tether has an internal tether capacitance between the first conductive path and the second conductive path.

4. The system of claim 3, further comprising:
at least one inductor connected between the transformer and the tether, wherein the high frequency AC voltage transmitted through the tether oscillates at a resonant frequency of the tether, and wherein the resonant frequency is based on the internal tether capacitance and on the at least one inductor.

5. The system of claim 1, further comprising:
DC leads coupled to the converter to provide a DC voltage associated with the generated power;
AC leads coupled to the converter to output the high frequency AC voltage with respect to the DC leads; and
a plurality of switches included in the converter to reverse polarity of the AC leads with respect to the DC leads while voltage across the AC leads is at or near zero.

6. The system of claim 1, further comprising:
a given transformer disposed in the ground station and electrically coupled to the tether, wherein the given transformer transforms the high frequency AC voltage from the high voltage transmission level to a lower voltage level; and
a given converter disposed in the ground station, wherein the given converter converts the transformed high frequency AC voltage, transformed by the given transformer, to a voltage configured to be distributed over a power distribution grid, and
wherein the ground station provides power to the power distribution grid using the converted voltage from the given converter.

7. The system of claim 6, wherein the ground station receives power from the power distribution grid,
wherein the given converter coverts the received power to a given high frequency AC voltage,
wherein the given transformer transforms the given high frequency AC voltage to the high voltage transmission level,
wherein the tether transmits the given high frequency AC voltage, transformed by the given transformer, to the aerial vehicle through the tether,
wherein the transformer in the aerial vehicle transforms the given high frequency AC voltage from the high voltage transmission level to the lower voltage level,
wherein the converter in the aerial vehicle converts the given high frequency AC voltage, transformed by the transformer of the aerial vehicle, to a DC voltage, and
wherein the aerial vehicle draws power from the converted DC voltage to power the aerial vehicle.

8. The system of claim 7, further comprising:
a propeller included in the aerial vehicle to generate thrust on the aerial vehicle; and
a motor disposed in the aerial vehicle to drive the propeller based on the power drawn from the converted DC voltage.

9. The system of claim 7, further comprising:
a control system included on the aerial vehicle, wherein the control system receives at least some of the power drawn from the converted DC voltage to operate the aerial vehicle.

10. A method comprising:
converting power to a high frequency AC voltage;
transforming the high frequency AC voltage to a high voltage transmission level;
transmitting the transformed high frequency AC voltage to an aerial vehicle through a tether, wherein the tether includes a first conductive path and a second conductive path configured to transmit the high frequency AC voltage by the first conductive path conducting the high frequency AC voltage with respect to the second conductive path;
transforming, via a transformer disposed on the aerial vehicle, the high frequency AC voltage from the high voltage transmission level to a lower voltage level;
converting the transformed high frequency AC voltage, transformed by the transformer to the lower voltage level, to a DC voltage; and
drawing power from the converted DC voltage to power the aerial vehicle.

11. The method of claim 10, wherein the tether has an internal tether capacitance between the first conductive path and the second conductive path.

12. The method of claim 11, wherein the high frequency AC voltage transmitted through the tether oscillates at a resonant frequency, wherein the resonant frequency is based on the tether capacitance and on at least one inductor connected between the transformer and the tether.

13. The method of claim 10, wherein converting the transformed high frequency AC voltage to a DC voltage is performed by a converter on the aerial vehicle, wherein the converter includes a plurality of switches configured to reverse the polarity of AC leads on which the high frequency AC voltage is input with respect to DC leads on which the DC voltage is provided, the method further comprising:
operating the plurality of switches to reverse polarity of the AC leads with respect to the DC leads while the voltage across the AC leads is at or near zero.

14. The method of claim 10, wherein drawing power from the converted DC voltage includes at least one of: (i) providing power to a motor-generator to cause the motor-generator to drive a propeller on the aerial vehicle and thereby generate thrust on the aerial vehicle, or (ii) providing power to a control system included on the aerial vehicle.

15. A method comprising:
  generating power by a generator coupled to a wind turbine situated on an aerial vehicle;
  converting the generated power to a high frequency AC voltage;
  transforming the high frequency AC voltage to a high voltage transmission level using a transformer on the aerial vehicle; and
  transmitting the transformed high frequency AC voltage to a ground station through a tether, wherein the tether includes a first conductive path and a second conductive path configured to transmit the high frequency AC voltage by the first conductive path conducting the high frequency AC voltage with respect to the second conductive path.

16. The method of claim 15, wherein the tether has an internal tether capacitance between the first conductive path and the second conductive path.

17. The method of claim 16, wherein the high frequency AC voltage transmitted through the tether oscillates at a resonant frequency of the tether, wherein the resonant frequency is based on the tether capacitance and on at least one inductor connected between the transformer and the tether.

18. The method of claim 15, wherein converting the generated power to a high frequency AC voltage is performed by a converter on the aerial vehicle, wherein the converter includes a plurality of switches configured to reverse polarity of AC leads on which the high frequency AC voltage is output with respect to DC leads on which a DC voltage associated with the generated power is provided, the method further comprising:
  operating the plurality of switches to reverse the polarity of the AC leads with respect to the DC leads while voltage across the AC leads is at or near zero.

19. The method of claim 15, further comprising:
  transforming, via a transformer disposed in the ground station, the high frequency AC voltage from the high voltage transmission level to a lower voltage level;
  converting the transformed high frequency AC voltage, transformed by the transformer, to a voltage configured to be distributed over a power distribution grid; and
  providing power to the power distribution grid using the converted voltage.

* * * * *